United States Patent
Kulkarni et al.

(10) Patent No.: US 10,202,527 B2
(45) Date of Patent: Feb. 12, 2019

(54) PRIMER-LESS TWO COMPONENT POLYURETHANE ADHESIVE

(71) Applicant: ILLINOIS TOOL WORKS, INC., Glenview, IL (US)

(72) Inventors: Mona Kulkarni, Telangana (IN); Nagesh Chitnavis, Telangana (IN); Tushar Sontakke, Telangana (IN); Subodh Deshpande, Telangana (IN); Zeenat Imam, Danvers, MA (US); Dave Bongiorni, Danvers, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 46 days.

(21) Appl. No.: 15/053,333

(22) Filed: Feb. 25, 2016

(65) Prior Publication Data

US 2016/0312090 A1 Oct. 27, 2016

Related U.S. Application Data

(60) Provisional application No. 62/152,031, filed on Apr. 24, 2015.

(51) Int. Cl.
- *C09J 175/04* (2006.01)
- *C08G 18/66* (2006.01)
- *C08G 18/10* (2006.01)
- *C09J 5/00* (2006.01)

(52) U.S. Cl.
CPC ............ *C09J 175/04* (2013.01); *C08G 18/10* (2013.01); *C08G 18/667* (2013.01); *C09J 5/00* (2013.01); *C09J 2475/00* (2013.01)

(58) Field of Classification Search
CPC combination set(s) only.
See application file for complete search history.

(56) References Cited

U.S. PATENT DOCUMENTS

| | | | |
|---|---|---|---|
| 3,755,261 A | 8/1973 | VanGulick | |
| 3,876,604 A | 4/1975 | Caruso et al. | |
| 3,991,255 A | 11/1976 | Blaskiewicz et al. | |
| 4,240,852 A | 12/1980 | Gomberg et al. | |
| 4,435,456 A * | 3/1984 | Hausch | B29C 73/02 138/104 |
| 4,485,135 A | 11/1984 | Koch | |
| 4,485,136 A | 11/1984 | Koch et al. | |
| 5,175,228 A | 12/1992 | Wang et al. | |
| 6,624,283 B2 | 9/2003 | Viegas et al. | |
| 2007/0088137 A1* | 4/2007 | Georgeau | C08G 65/336 525/487 |
| 2008/0057316 A1* | 3/2008 | Landon | C08G 18/10 428/423.1 |
| 2009/0098388 A1* | 4/2009 | Harvey | C08G 18/10 428/429 |
| 2009/0124751 A1* | 5/2009 | Lucas | C08G 18/10 524/507 |
| 2013/0131244 A1* | 5/2013 | Dickens | C08K 3/26 524/264 |
| 2013/0267637 A1* | 10/2013 | Varkey | C08G 18/12 524/270 |
| 2013/0303690 A1* | 11/2013 | Varkey | C08G 18/12 524/590 |

FOREIGN PATENT DOCUMENTS

| | | |
|---|---|---|
| EP | 0449616 A2 | 10/1991 |
| WO | 2009058420 A1 | 5/2009 |
| WO | 2012010558 A1 | 1/2012 |

OTHER PUBLICATIONS

International Search Report dated Aug. 4, 2016 for PCT/US2016/029071, filing date Apr. 22, 2016.

* cited by examiner

*Primary Examiner* — Erma C Cameron

(74) *Attorney, Agent, or Firm* — Avery N. Goldstein; Blue Filament Law PLLC

(57) ABSTRACT

A process of applying an adhesive to an elastomer includes the application to the elastomer of a two part adhesive formulation. The adhesive having a Part A including at least a polyol, an adhesion promoter, a chain extender, a catalyst, a water scavenger; and a Part B comprising: polyurethane prepolymer, adhesion promoter and a plasticizer. The two part adhesive formulation is cured to form the adhesive. In contrast to the prior art, no priming or surface activation is required to obtain a high strength bond to the elastomer. The resulting article of an elastomer with the resultant adhesive is sufficiently strong to result in surface peel off of the elastomer. A kit is provided for the repair of an elastomer without resort to priming the elastomer.

11 Claims, No Drawings

_US 10,202,527 B2_

PRIMER-LESS TWO COMPONENT POLYURETHANE ADHESIVE

RELATED APPLICATIONS

This application is a non-provisional application that claims priority benefit of the U.S. Provisional Application Ser. No. 62/152,031 filed 24 Apr. 2015; the content of which is hereby incorporated by reference.

FIELD OF THE INVENTION

The present inventions in general relates to polyurethane adhesive, and in particular to adhesives that are primer-less, solvent-free and well suited for rubber bonding, especially in the context of conveyors and belts.

BACKGROUND OF THE INVENTION

Thermoplastic rubbers are relatively inexpensive and widely employed in industries where abrasion resistance is highly needed. Black styrene butadiene rubber (SBR) sheets are used as conveyor belt, belt wipers also for sealing strips, general construction mounting pads, in gasket applications and also in a large number of applications such as (e.g. footwear, adhesives manufacturing, molded or extruded goods). However, due to the non-polar nature of this rubber and indeed elastomers as a class of materials, it is difficult to achieve bonding between elastomers. Vulcanized rubbers are especially difficult to bond due to low molecular weight ingredients therein that tend to migrate to the rubber surface limiting interaction with the adhesive.

Polyurethane (PU) adhesives and sealants have for years played a significant role in numerous industrial applications due to their advantageous properties such as high hardness, modulus and excellent mechanical properties. However, passage of the Clean Air Act Amendments in 1990 in the United States and similar legislation to restricted exposure to many chemicals including components associated with PU. However, the bonding of elastomeric substrates remains challenging with PU adhesives owing to the difficulty in bonding and the elongation requirements on any such bond. As a result, it is conventional to the art to use a surface treatment to effectively bond adhesives to elastomers. The treatment is typically accomplished by sulfuric acid etching or by the application of a primer such as those described in U.S. Pat. No. 4,485,135 or U.S. Pat. No. 4,485,136. A well accepted primer for use on SBR (styrene-butadiene rubber) and the like is a 2% solution of 1,3-dichloro-5,5-dimethyl hydantoin in methyl chloride.

Surface treatments have proven to be suitable for the improvement of adhesion and wettability properties of non-polar synthetic rubbers. The adhesion of rubber has improved by changing the rubber composition or by modifying surfaces of the rubber surface by the use of a chemical agent (halogenation, cyclization, etc.) or using high energy irradiation such as bombarding the surface by electron beam or gamma irradiation to otherwise increase the number of surface bonding sites per unit area on the rubber surface. While these costly surface modifications are readily integrated into the production of new products, field repairs relying on such solutions or radiation are difficult to perform reliably and extend the duration of repairs. Additionally, many solvents are toxic to handle and may be prohibited from certain areas such as food or pharmaceutical production facilities. Another limitation of surface activation is the limited duration of such activity before the surface energy reverts to pre-treatment levels.

Commercially available adhesives for bonding rubber surfaces have met with limited acceptance owing to the need for a primer or a pre-wetting step in order to achieve adhesion, inclusion of organic solvents, low strength bonding compared to rubber to rubber vulcanization and as a result rapid adhesive failure. The reliance of existing adhesives on a primer to ensure a good adhesion poses significant problems with substrates that have distinctly uneven surfaces as the adhesive fails to fill spaces uniformly. Similarly, rigid substrates tend to have adhesive voids that weaken the strength of the adhesive bond.

Thus, there remains a need for an adhesive for bonding non-polar elastomeric surfaces that exhibits excellent adhesion without the necessity of resorting to primers or other surface treatments that change the surface energy. There further exists a need for such an adhesive to be amenable to application without resort to solvents, as solvents tend to pose health concerns and degrade bond properties.

SUMMARY OF THE INVENTION

A process of applying an adhesive to an elastomer includes the application to the elastomer of a two part adhesive formulation. The adhesive having a Part A including at least a polyol, an adhesion promoter, a chain extender, a catalyst and a water scavenger; and a Part B includes at least polyurethane prepolymer and a plasticizer. The two part adhesive formulation is cured to form the adhesive. In contrast to the prior art, no priming or surface activation is required to obtain a high strength bond to the elastomer. The resulting article of an elastomer with the resultant adhesive is sufficiently strong to result in surface peel off of the elastomer. A kit is provided for the repair of an elastomer without resort to priming the elastomer.

DETAILED DESCRIPTION OF THE INVENTION

The present invention has utility as a primer-less and in some embodiments, solvent-free, two-component polyurethane adhesive for bonding of elastomeric substrates. An exemplary elastomeric substrate is a conveyor belt. The resulting elastomer bonded to an elastomer with an inventive adhesive also represents a novel article. As the present invention does not require a primer and lacks solvents, field application to repair conveyor belts and other elastomeric materials are greatly facilitated. A method of forming such an adhesive and the use thereof to form a bond are also detailed herein. A patch kit is also provided that is particularly well suited by repairing elastomeric articles without resort to priming, or surface activation.

The present invention has many applications that illustratively include field repair of tears or worn spots in rubber-based articles. By way of example, repairing conveyor belt tears or worn spots greatly extends the longevity of such articles while limiting down time of the article and the need to inventory spare articles.

Elastomers joined by an inventive adhesive include natural and synthetic rubbers, as well as fiber or particle reinforced rubber articles, such as tires, hoses, conveyor belts, transmission belts, tensioning straps, snowmobile treads, and other vehicle treads. Elastomers that are bonded by an inventive adhesive illustratively including butyl rubber (co-polymer of isoprene and isobutylene, IIR), chlorinated butyl rubber (CIIR), brominated butyl rubber (BIIR), chloroprene rubber (CR), isoprenes of both natural (NR) and synthetic (IR) origins, butadiene rubber (BR), Nitrile rubber (copolymer of butadiene and acrylonitrile, NBR), SBR (styrene-butadiene rubber), epichlorohydrin rubber (ECO), polyacrylic rubber (ACM), silicone rubber (SI), fluorosilicone rubber (FVMQ), chlorosulfonated polyethylene (CSM), and ethylene vinyl acetate (EVA). While the present invention is further illustrated in terms of bonding worn out SBR conveyor belt parts, similar performance is observed in several of the aforementioned other elastomers including Styrene-butadiene-styrene thermoplastic rubbers (SBS) are commonly used in the footwear industry as sole materials, ultra high molecular weight rubbers, high heat resistant rubbers and the like.

As used herein, the terms "elastomer" and "rubber" are used interchangeably.

As used herein, the molecular weight is the weight-average molecular weight of the polymer which is determined by gel permeation chromatography (GPC, also called SEC). This method is known to one skilled in the art.

The present invention includes a two part adhesive formulation for use in bonding thermoplastic elastomeric articles. The inventive formulation is readily produced with a functional cure time of from 60 minutes to 6 hours, with still other inventive formulations have functional cure time of from 80 to 180 minutes. The inventive formulation has thermal stability over a wide temperature range of −20 degrees Celsius to 50 degrees Celsius.

As used herein, the functional cure time is defined as the time the adhesive takes to reach sufficient strength to be put into light operation.

The resulting adhesive exhibits superior mechanical and bonding properties as compared with commercially available and commonly used adhesive for bonding thermoplastic rubbers with adhesive strengths in some embodiments that induce elastomer surface failure instead of adhesive delamination. Additionally, an inventive adhesive formulation cures at a different levels of humidity from extremely dry to almost 90% humid climatic condition and including ambient temperatures with 50% relative humidity thereby facilitating field repairs of elastomers. Attributes of an inventive two part polyurethane adhesive include: a shelf life of a nine to ten months at 25° C., embodiments that are solvent-free, and adhesion to substrates besides elastomers that illustratively including fabric and wood.

As used herein, the al stability is defined as the ability of the inventive adhesive to exhibit constancy in performance properties when stored at specified temperature for considerable period of time. Typically, this test is used to determine shelf life of formulated material. It has been found that the inventive adhesive separate parts are stable at 60 degrees Celsius for 5 days, which predicts an inventive adhesive formulation will remain stable for minimum 9-10 months under standard temperature and pressure (STP) conditions. This test is important in view of long term performance of sealant.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive formulation provided as a two-part formulation. The following inventive formulation are detailed as weight percentages in Table 1.

TABLE 1

Components for an inventive adhesive, where amounts are provided in weight percentage per part.

Part-A: Adhesive/Resin

| Component: | Percentage of Part A: |
|---|---|
| Polyol | 20-97.7% |
| Water scavenger | 0.1-20% |
| Adhesion promoter | 0.01-10% |
| Chain extender | 0.001-10% |
| Catalyst | 0.001-8% |
| Co-catalyst | 0.001-2% |
| Antioxidants | 0.2-3% |
| UV stabilizers | 0.5-5% |
| Plasticizer | 0.5-40% |
| Filler | 1-40% |
| Thixotropic agent | 0-20% |
| Cross-linker/toughening agents | 0-20% |
| Processing additive/compatibilizer | 0-5% |
| Dispersing agent | 0-5% |

Part B: Hardener/Activator

| Component: | Percentage of Part B: |
|---|---|
| Polyurethane prepolymer | 5-99% |
| Plasticizer | 1-50% |
| Adhesion promoter | 0.01-10% |
| Filler | 0-40% |
| Thixotropic agent | 0-20% |
| Blocking agent | 0-10% |
| Fungicides/biocides | 0-2% |
| Diluents/other additives | 0-2% |
| Antioxidants | 0-2% |
| Dispersing agent | 0-3% |

The Parts A and B are readily admixed to form curable adhesive. While the relative amounts of Parts A and B are varied to form an adhesive, generally the weight ratio of Parts is 1:1:1:1 to 1:1.75±10% to weight ratio of Parts being particularly easy to use for field repairs. The term "polyols" is intended to include polyols having 2 or more hydroxyl moieties per molecule; with 2 to 4 hydroxyl moieties per molecule being most common.

The polyols used in the present invention are those such as are normally used in polyurethane chemistry. Besides hydroxyl-containing polyacrylates, polyethers, polyesters, polycarbonates, oleochemical polyols and polybutadienes; in certain embodiments, the polyol is a polyoxyalkylene polyols, such as polyoxyethylene polyols, polyoxypropylene polyols and polyoxybutylene polyols, and combinations thereof.

The polyether types of polyols operative in forming a polyurethane according to the present invention also include polyether polyols of higher functionality than three {e.g., poly(oxypropylene adducts of pentaerythritols) and poly(oxypropylene adducts of sorbitol)}. The polyester types of polyols operative in forming a polyurethane according to the present invention include chain extended polyesters made from a glycol (e.g., ethylene and/or propylene glycol) and a saturated dicarboxylic acid (e.g., adipic acid). By way of non-limiting example, these include poly(ethylene adipate) glycol, poly(propylene adipate) glycol, poly(butylene adipate) glycol, poly(caprolactone) glycol, poly(ethylene adipate-phthalate) glycol, poly(neopentyl sebacate) glycol, and combinations thereof. Small amounts of trialcohols such as trimethylolproprane or trimethylolethane are included in some embodiments of the polyester preparation.

Polyester polyols with functionalities of three or more (e.g., glycerides of 12-hydroxystearic acid) are also useful to induce a degree of branching. Suitable polyester polyols include those obtainable by reacting such polyols as 1,4-butanediol, hydroquinone bis(2-hydroxyethyl) ether, ethylene glycol, diethylene glycol, triethylene glycol, propylene glycol, dipropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methylglucoside, and the like, with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid, and chlorendic acid; the acid anhydrides and acid halides of these acids may also be used. Also biodegradable polyesters such as polycaprolactone diols with low acid value may also be suitable for the said application Oleochemical polyols are based on natural oils and fats, e.g. the reaction products of epoxidized fats with mono-, di- or poly-hydric alcohols or glycerine esters of long chain fatty acids that are at least partially substituted with hydroxyl groups, e.g. beef tallow, palm oil, peanut oil, rapeseed oil, cotton seed oil, soya oil, sunflower oil and linseed oil. Epoxidized triglycerides such as epoxidized soya oil and epoxidized linseed oil are commercially available and particularly well-suited to form adhesives according to the present invention.

The molecular weight of the polyols used in the present invention is typically in the range of 250-30,000 atomic mass units.

The polyurethane prepolymer is prepared from at least one polyol and at least one polyisocyanate, where a polyisocyanate, as used herein is defined as molecule having at least two isocyanate moieties. It is appreciated that the level of functionality in a polyisocyanate comprise ranges from an average of 2 to 6 moieties per molecule, with an average of between 3-4, and between 2-3 moieties per molecules being used in specific inventive embodiments. Exemplary polyurethane pre-polymer components are known to be based on the reaction products of isocyanates and polyhydric alcohols. Suitable polyisocyanates are aliphatic, cycloaliphatic or aromatic. Diisocyanates are well suited as polyisocyanates in the present invention to limit branching in the resultant polyurethane prepolymer. Polyols used to form the polyurethane prepolymers include any of the aforementioned polyols, or a combination thereof.

Polyisocyanates operative in the present invention illustratively include 4,4'-diphenylmethane diisocyanate (MDI), hydrogenated MDI (Hi2MDI), xylene diisocyanate (XDI), tetramethylxylene diisocyanate (TMXDI), 4,4'-diphenyidimethylmethane diisocyanate, di- and tetraalkylene diphenylmethane diisocyanate, phenyl isocyanate, 1,5-naphthylene diisocyanate, 4,4'-dibenzyl diisocyanate, 1,3-phenylene diisocyanate, 1,4-phenylene diisocyanate, the isomers of toluene diisocyanate (TDI), optionally in a mixture, 1-methyl-2,4-diisocyanato cyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), phosphorous-containing diisocyanates, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid bis-isocyanatoethyl ester, 1,12-diisocyanato dodecane, dimerized fatty acid diisocyanates, and combinations thereof.

Plasticizers operative herein illustratively include tris(2-ethylhexyl) trimellitate (TOTM), trimethyl pentanyl diisobutyrate, phthalate free $C_1$-$C_{20}$ alkylsulphonic acid ester with phenol, benzoate ester, mesamoll, biobased plasticizers such as bio succinic acid or soy based plasticizers and combinations thereof.

A moisture scavenger operative herein illustratively includes methyldiphenylethoxysilane; vinyl trimethoxy silane (VTMO), vinyl triethoxy silane; molecular sieves, p-toluenesulfonyl isocyanate (PTSI), p-toluenesulfonyl isocyanate (TI), acid anhydride esters, such as diethyl malonate and dimethyl succinate; and combinations thereof.

A chain extender operative in the present invention illustratively includes a mixture of 2,4 and 2,6 isomers of diethyltoluenediamine (DETDA), piperazine, diethylenediamine (DEDA), monoethanolamine (MEA), methylenebis (N,N-dibutyldianiline), isophoronediamine (IPDA), a mixture of 3,5-dimethylthio-2,4-toluenediamine and -2,6-toluenediamine isomers, dodecyl mercaptan, tertiary dodecyl mercaptan, 1,3 butanediol, 1,4 butane diol, propane 1 2 diol 1,6 hexane diol or a combination thereof.

An adhesion promoter is also present in certain inventive formulations to achieve improved surface bonding of inventive adhesive compared to formulations lacking the same by modifying the hydrophobicity of the substrate surface. An adhesion promoter operative in the present invention illustratively includes 3-aminopropyl triethoxy silane (AMEO), 3-aminopropyl trimethoxy silane, 3-glycidoxypropyltrimethoxysilane, N-(beta-aminoethyl) gamma aminopropyltrimethoxysilane, Bis(3-triethoxysilylpropyl)tetrasulfide, gamma mercapro propyl trimethoxy silane, N-beta-(aminoethyl)-gamma-aminopropyl-methyldimethoxysilane, Bis (pentane-2,4-dionato-O,O')bis(alkanolato)titanium, Tetrabutyl Titanate, diamino-functional silane (e.g. DAMO), a bifunctional oroganosilane having a primary amine and a hydrolyzable methoxysilyl groups (e.g. AMMO) and combinations thereof.

Antioxidant operative herein illustratively include ditridecyl-thiodipropionate (DTDTDP), dilauryl thiodipropionate (DLTDP), distearyl thiodipropionate (DSTDP) and 3,5-Bis(1,1-dimethylethyl)-4-hydroxybenzenepropanoic acid octadecyl ester (1076), Tris(2,4-di-tert-butylphenyl) phosphite, and combinations thereof.

A filler operative herein illustratively includes carbon black, talc, calcium carbonate, fumed silica, colloidal silica, calcite, limestone, mica, talc, asbestos fibers or powder, diatomaceous earth, metal particulate, barium sulfate, alumina, slate flour, calcium silicate, magnesium carbonate, magnesium silicate, $TiO_2$ (rutile), materials like corundum ($Al_2O_3$) or zirconia ($ZrO_2$) and combinations thereof.

UV stabilizers operative herein illustratively includes benzotriazoles, benzophenones, triazines, hindered amine light stabilizers, 2-(benzotriazol-2-yl)-4-(2,4,4-trimethylpentan-2-yl)phenol, 3,5-di-t-butyl-4-hydroxybenzoic acid, hexadecyl ester and combinations thereof.

A catalyst operative herein illustratively includes bismuth carboxylates such as acetate, oleate, octoate or neodecanoate; bismuth nitrate; bismuth halides such as bromide, chloride or iodide; bismuth sulfide; basic bismuth carboxylates such as bismuthyl neodecanoate, bismuth subgallate, or bismuth subsalicylate; and combinations thereof.

An inventive polyurethane adhesive formulation includes in specific embodiments an organometallic catalyst that is customary in polyurethane chemistry, as a co-catalyst. A co-catalyst illustratively includes organo-tin compounds, such as tin(II) octoate, dibutyltin dilaurate or dibutyltin diacetate; tertiary amines such as DABCO (=1,4-diazabicyclo[2.2.2]octane) or 2,2'-dimorpholinodiethyl ether; or combinations thereof.

A thixotropic agent operative herein illustratively includes hydrophobic silica, carbon black, calcium carbonate, or combinations thereof. It is appreciated that different types of thixotropic agent can be employed as reinforcing agent/rheology modifiers.

A cross-linkers/toughening agent operative herein illustratively includes copolymers of styrene, copolymers of styrene and butadiene, carboxylated polychloroprenes, carboxylated polyacrylonitrile-butadiene copolymers, copolymers of ethylene and vinyl acetate, copolymers of styrene and olefinically unsaturated hydrocarbons, polybutylene, acrylate-based elastomers, acrylate/methacrylate based oligomers and mixtures thereof.

Same includes mercapto silane, tetrasulfide silanes, silquest A-15, A-35, epoxy silane, isocyanate silane, vinyl silane, thiocyanato silane, phenyl silane and the like.

Additions of various other constituents known in the art may be made to the basic composition. For example, blocking agent, Inhibitors, resin, chelating agent, corrosion inhibitor, pigments, spacers, fragrance, fire retardants, accelerator, fungicides/biocides and the like.

Diluents operative herein illustratively include dimethylcarbonate, propylene carbonate, tert butyl acetate, ethyl acetate, propyl acetate, methyl ethyl ketone, dichloromethane, trochloro ethylene and the like.

A block agent operative herein illustratively includes phenols, oximes, alcohols, caprolactam, and diethyl malonate. The choice of the blocking agent depends in part on its volatility and processing temperature. Some of the advantages of the blocked isocyanate in coated abrasive belt repair applications are long pot life and insensitivity to moisture levels of the ambient air.

The inventive compositions optionally include other additives conventional to the sealant art including but not limited to non-reactive resins, chelating agents, colorants e.g. pigments, dyes), flame retardants, spacers, cure inhibitors, accelerators and mixtures thereof.

Based on the above description, it would be appreciated that an inventive adhesive formulation is readily formed free of VOCs and solvents. Additionally, the rheological properties of the formulation are readily adjusted for a range of viscosities to serve a desired application. Further, with inclusion of adhesion promoters, an inventive adhesive is readily applied without resort to prior application of a primer to the substrate, sanding, or otherwise roughening the substrate surface.

Regardless of the form of an inventive formulation, upon induction of pot life for the formulation, the formulation is present in simultaneous contact with two or more substrates for an amount of time sufficient to achieve a bond between the substrates. Two such substrates can be brought together to form various jointed structures such as a lap joint, butt joint, corner joint, edge joint, and T-joint. In still other embodiments, an inventive formulation is applied to a single substrate and allowed to cure to form a coating that affords substrate protection or is operative as a primer for subsequent material applications. Substrates are fixtured or otherwise held in relative desired alignment for a time period of from 5 minutes to 120 minutes. The joined substrates are then amenable to being removed from the fixture while an inventive formulation continues to cure to achieve terminal strength. Typical thicknesses of an inventive adhesive formulation are between substrates ranges from 0.001-4 mm. Alternatively, the inventive adhesive is applied to form a bulk plug.

A kit is provided including a Part A and a Part B of an inventive adhesive formulation along with instructions for the mixing the Parts together and applying to a first substrate. Conditions for forming a plug, patch, or joinder to a second substrate are also provided. Instructions also include in some embodiments the removal of debris and particulate from the substrate prior to application of the mixed Parts A and B thereto, Instructions in some instances detail application thickness and fixturing specific to elastomeric substrates.

The present invention is further described with respect to the following non-limiting examples. These examples are intended to illustrate specific formulations according to the present invention and should not be construed as a limitation as to the scope of the present invention.

Example 1. Process for Preparing Polyurethane Adhesive Part A

Step 1 Polyether polyols, processing additive/compatibilzer, moisture scavenger, antioxidants, UV stabilizers, dispersing agent and plasticizer are added together to the mixing kettle equipped with mechanical stirrer and nitrogen gas blanketing. All the ingredients were blended by swirling the mixture for approx. 10-15 minutes at room temperature of 20° Celsius.

Step 2—Fillers, short chain diol as a chain extender, and cross-linkers are added in the above mix and were stirred for 30 minutes at 500-1500 rpm.

Step 3—After 15 minutes, desired amount of thixotropic is added slowly to the mixture and stirred for another 180 minutes to form a homogeneous mass. Further agitator speed is raised to 800 rpm to ensure uniform mixing of all the ingredients.

Steps 4—Stirred the mass for 15 minutes at 1000 rpm till mass becomes smooth paste. Reduce the speed to 200 rpm and adhesion promoters (silane) and catalyst & co-catalyst were added very slowly to the reaction mass. Evacuate the reactor for 20 minutes under vacuum 600 mm Hg to remove entrapped bubbles and packed in nitrogen atmosphere.

Recorded lab batch cycle time for Adhesive is approximately 4-4.5 hours.

Example 2. Process for Preparing Hardener/Activator-Part B

Step 1—Mid Functional, mid-NCO polyurethane prepolymer, plasticizer, fillers and thixotropic agent are added together to the reaction kettle equipped with mechanical stirrer and nitrogen gas blanketing. All the ingredients are blended by swirling the mixture for approx. 10-15 minutes at room temp.

Step 2—Adhesion promoter, blocking agent and fungicide/biocides, dispersing agent if need be are added in the above mix and were stirred for 15 minutes at 200 rpm.

Step 3—After 15 minutes, desired amount of diluent if need be is added slowly to the reaction mixture and is stirred for another 15 minutes until a homogeneous mass forms.

Steps 5—Stopped the agitator. Evacuate the reactor for 20 minutes under vacuum 600 mm Hg to remove entrapped bubbles and packed in nitrogen atmosphere.

Recorded lab batch cycle time for Adhesive is approximately 1-1.5 hours.

Example 3. Experimental Data-Development of Peel Adhesion Strength

Peel strength is tested on reinforced high strength styrene butadiene rubber substrates. A rapid strength development for an inventive adhesive formulation by combining Examples 1 and 2 Parts A and B is noted in Table 2.

TABLE 2

Peel strength as a function of time for adhesive formulation

| Time | Peel strength in pounds per linear inch (pli)/(N/mm) |
|---|---|
| 2 Hr. | 30/5.25 |
| 3 Hrs. | 52/9.1 |
| 5 Hrs. | 83/14.5 |
| 24 Hrs. | 190/33.3 |
| 7 Days | 266/46.6 |

Example 4. Inventive Adhesive Properties Relative to Reference Materials

Properties of an inventive adhesive are provided in Table 3 and compared to 3 reference comparative compositions on the same substrates and applied at a like thickness of 1 mm.

TABLE 3

Properties of inventive adhesive compared to conventional prior art adhesives.

| | Description | | | |
|---|---|---|---|---|
| | Ref 1 | Ref 2 | Ref 3 | Inventive formulation |
| | Components | | | |
| | 4 Resin (Part A) Hardener (Part B) Primer Cleaning agent | 4 Resin (Part A) Hardener (Part B) Primer Cleaning agent | 4 Resin (Part A) Hardener (Part B) Primer Cleaning agent | 2 Resin (Part A) Hardener (Part B) |
| Pot life in min/ Working time - Quantitatively | 4.30 mins | 10 mins | 30 mins | 10-15 mins |
| Functional cure time | 2 hrs | 5-6 hrs | 6-8 hrs | 1.5 hrs |
| Hardness shore A | 90 | 78 | 60 | 90 |
| Peel strength (pli) 2 hrs | 8 | Not cured | Not cured | 30 |
| Peel strength (pli) 3 hrs | 9.7 | Not cured | Not cured | 52 |
| Peel strength (pli) 5 hrs | 12 AF* | 16 CF** | Not cured | 83 |
| Peel strength (pli) 24 hrs | 70 AF | 45 AF | 8 | 190 surface pull off rubber |
| Peel strength (pli) 7 days | 137 Surface pull off | 85 Surface pull off | 21 | 266 surface pull off rubber |

*AF—adhesive failure
**CF—component failure

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A process of applying an adhesive to an elastomer comprising:
    applying to the elastomer two part adhesive formulation of a Part A comprising: a polyol, an adhesion promoter, a chain extender, a catalyst, water scavenger; and a Part B consisting of: polyurethane prepolymer synthesized from at least one polyol and at least one isocyanate, a silane adhesion promoter, and a plasticizer; and
    curing the two part adhesive formulation to form the adhesive as a polyurethane.

2. The process of claim 1 wherein said polyol is 20-97.7% weight percent of said Part A.

3. The process of claim 1 wherein said polyurethane prepolymer is 5-99% weight percent of said Part B.

4. The process of claim 3 wherein said polyurethane prepolymer has a weight-average molecular weight 250-30,000 atomic mass units.

5. The process of claim 1 wherein said two part adhesive formulation is premixed prior to the applying.

6. The process of claim 1 wherein the applying is not preceded by priming the elastomer.

7. The process of claim 1 wherein the applying is not preceded by exposing the elastomer to surface activation.

8. The process of claim 1 further comprising bringing a substrate into simultaneous contact with said two part adhesive prior to the curing to form a bond between the elastomer and the substrate via the adhesive.

9. The process of claim 1 wherein the elastomer is styrene butadiene rubber.

10. The process of claim 1 further comprising joining the elastomer to another elastomer, the another elastomer being at least one of butyl rubber (copolymer of isoprene and isobutylene), chlorinated butyl rubber, brominated butyl rubber, chloroprene rubber, isoprene rubber, butadiene rubber, Nitrile rubber (copolymer of butadiene and acrylonitrile), styrene-butadiene rubber, epichlorohydrin rubber, polyacrylic rubber, silicone rubber, fluoro silicone rubber, chlorosulfonated polyethylene, or ethylene vinyl acetate.

11. The process of claim 1 wherein the elastomer is a conveyor belt.

* * * * *